United States Patent

[11] 3,630,091

[72] Inventors William M. Scarborough
 Whittier;
 Doyle E. Wilcox, Hacienda Heights, both of Calif.
[21] Appl. No. 42,359
[22] Filed June 1, 1970
[45] Patented Dec. 28, 1971
[73] Assignee North American Rockwell Corporation

[54] RATE AND/OR ACCELERATION SENSOR
 10 Claims, 1 Drawing Fig.
[52] U.S. Cl. .................................................... 73/517 AV
[51] Int. Cl. ..................................................... G01p 15/10
[50] Field of Search ........................................ 73/517

[56] References Cited
 UNITED STATES PATENTS
 3,071,974 1/1963 Peterson ........................ 73/517
 3,153,351 10/1964 Holmes .......................... 73/517

Primary Examiner—Richard C. Queisser
Assistant Examiner—Herbert Goldstein
Attorneys—L. Lee Humphries, H. Fredrick Hamann and Edward Dugas ABSTRACT: The invention is directed to a proof body such as a gyroscope in which the spin axis is constrained to the housing or vehicle by five pairs of orthogonally disposed wire pairs. The tension force each wire exerts on the gyroscope is sensed by determining the frequency of transverse vibration in each wire. The acceleration along three orthogonal axes and the rate of turn about two axes is obtained by processing the vibration-frequency data so as to solve the relationship: Tension = $K$(frequency),$^2$ for each wire. A tension control servo means is utilized for comparing the vibration frequency of the wire opposite a tension transducer with a precision reference frequency. The resulting error signal is used to activate the tension transducer so as to maintain a constant frequency (and tension) in the opposite wire under all acceleration and rate conditions. Consequently, the strain in the opposite wire of each pair will remain constant and the axes orientation of the gyroscope will remain fixed while the other wire of each pair will be vibrating at a frequency which will be proportional to the forces acting on the gyroscope.

Means are provided for sensing this frequency and for providing an output signal which is proportional to the acting force. An accelerometer proof mass can be substituted for the gyroscope as a proof body with a resultant loss in rate sensing.

RATE AND/OR ACCELERATION SENSOR

BACKGROUND OF THE INVENTION

This invention relates generally to rate and/or acceleration sensors and, more particularly, to a supported proof body for detecting rate and/or acceleration. A prior art patent of interest is U.S. Pat. No. 3,143,891, entitled "Angular Accelerometer," by A. M. Voutas. In the system disclosed in this patent, the angular displacement detector is a vibrating member or pair of members whose natural frequency varies in accordance with the torsional stress applied thereto. The relative angular displacement of the casing of the accelerometer with respect to the inertia mass causes a torsional stress to be applied to the vibrating member. The angle of displacement is measured by the change in natural frequency of the vibrating member, or the difference in natural frequencies of a pair of oppositely affected vibrating members.

Another patent of interest is U.S. Pat. No. 3,329,027, entitled "Accelerometer," by Davidson et al. The vibrating wire accelerometer in the reference patent is so designed that the sum frequency of opposed wires is kept constant. This feature is obtained by providing a transducer on at least one the wires. The transducer controls the tension of that particular wire.

Another patent of interest is U.S. Pat. No. 3,382,724, entitled "3-Axis Accelerometer," by Doyle E. Wilcox, of the inventors of the present sensor. The device of that patent is a three-axis accelerometer which utilizes a proof mass suspended by six string members, which string members extend from the proof mass along the three axes. The string members are whirled in a circular orbit, the frequency of which will vary as a function of the acceleration.

One of the main features of the present invention which is not taught in the prior art is the means for keeping the tension on one wire constant while utilizing the other wire of a pair to provide a frequency signal which is equal to the sum of the forces acting on the proof body and the tension felt in the constant vibrating wire.

SUMMARY OF THE INVENTION

The rate and/or acceleration sensor of the present invention is comprised of a reference frame and a proof body which may be either a gyroscope or an accelerometer proof mass which is mounted to the reference frame by means of five pairs of string members which support the gyroscope or proof mass along three orthogonal axes. Means are provided for exciting a natural frequency of vibration in the string members. Pickoff means are used to sense the frequency of vibration in each string of a pair, wherein the frequency of vibration is a function of the tension in each string member, which tension is proportional to the force acting on the gyroscope or proof mass. Transducer means interposed between the first string of each pair are utilized to adjust the tension in the second string to remain constant at or near said natural frequency in response to the signals from the pickoff means. Utilization means, for example, a computer, receive the pickoff signal from the first string of each pair, which signals are proportional to the forces acting on said gyroscope or proof mass.

It is, therefore, an object of the present invention to provide a new and improved rate and/or acceleration sensor.

It is a further object of the present invention to provide a string mounted proof body, capable of measuring rate and/or acceleration.

Still a further object of the present invention is the provision of a new and improved three-axis accelerometer, utilizing a proof mass.

The foregoing and other objects of the present invention will become more apparent and better understood when taken in conjunction with the following description and accompanying drawings, throughout which like characters indicate like parts and which drawings form a part of this application.

BRIEF DESCRIPTION OF THE PREFERRED EMBODIMENT

Figure 1:
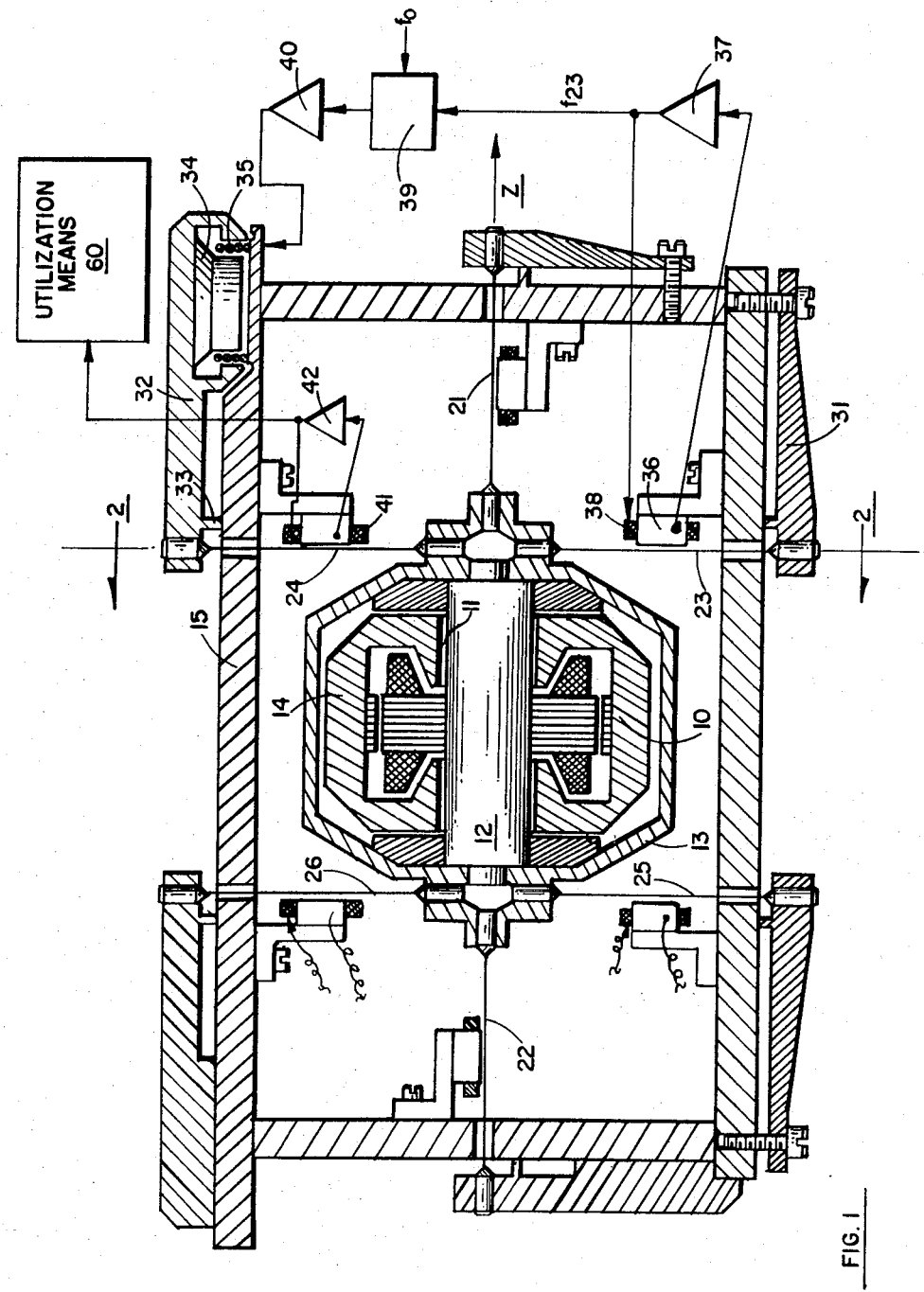
FIG. 1 illustrates in a cross-sectioned view a preferred embodiment of the invention.

Referring to FIG. 1 wherein is disclosed a rate and/or acceleration sensor 9 in which a gyroscope rotor 10 is suspended within a housing 13 by means of pairs of string members 21–22, 23–24, 25–26, 27–28, and 29–30. The string pairs 23–24 and 25–26 are parallel to each other; with pairs 27–28 and 29–30 parallel to each other. Each of the parallel pairs are mutually orthogonal with respect to each other and with respect to the pair 21–22. The tension force each suspension wire exerts on the gyroscope wheel is sensed by exciting low-frequency transverse vibrations in the wire and sensing the natural frequency of vibration. The natural frequency of transverse vibration of a tensioned wire or ligament is related to the tension force by the equation $$f^2 = \frac{EI\pi^2}{4ml^3} + \frac{T}{4ml} \qquad (1)$$

in this equation,
$f$ = frequency of vibration
$E$ = modulus of elasticity of the wire
$I$ = cross-sectional moment of inertia or wire
$m$ = mass of the wire
$l$ = length of the wire
$T$ = tension force The gyroscope rotor 10 is supported by the gas bearing 11 on shaft 12 within housing 13. The rotor is driven by motor 14 mounted in the center of shaft 12. Power for motor 14 is supplied through a set of flexible leads connected between the housing 13 and the structure 15. The housing 13 is suspended by means of the aforementioned five colinear pairs of wires. Wires 21 and 22 are disposed along the Z or spin axis and constrain the gyroscope housing 13 to the structure 15 along this axis. Wires 23 and 24 constrain one end of the gyroscope housing in the direction of the X-axis, and wires 25 and 26 constrain the other end of the gyroscope along the X-axis. These four wires, 23, 24, 25 and 26, also provide angular constrain of the gyro housing 13 about the Y-axis. Wires 27 and 28 constrain one end of the gyro housing 13 within the structure 15 in the direction of the Y-axis and wires 29 and 30 (not shown) constrain the other end of the gyroscope within the structure 15 along the Y-axis. Wires 27, 28, 29 and 30 also provide angular constrain of the housing 13 about the X-axis.

Although a gyroscope is shown as the proof body, it would be obvious to substitute an accelerometer proof mass for the proof body. The accelerometer proof mass would not be able to sense rate and, therefore, this function would be lost.

One wire of each wire pair has its outer end attached securely to a member providing some position adjustment, such as member 31. The outer end of the other wire comprising the pair is securely fastened to an electromagnetic force transducer such as member 32.

Force transducer member 32 is comprised of a cantilever beam attached to structure 15 by means of a thin flexure section (fulcrum) 33. One end of this beam carries a cylindrical permanent-magnetic field stator 34, commonly termed a potmagnet or loudspeaker field. The current-carrying armature 35 is a cylindrically wound coil which is attached to the structure 15, and engages the magnetic field of stator 34. With this arrangement, an electric current flowing through armature 35 will exert a force on stator 34 proportional to the current and the magnet field intensity. Hence, by means of the leverage ratio of transducer member 32, the force developed by armature 35 is increased as it is applied to wire 24.

The lever member can be constructed with its center of mass located in the region of the cylindrical permanent magnet field stator 34 on the opposite side of the flexure section 33 from the wire attachment point. The lever mass is adjusted such that an acceleration applied along the axis of the wire causes a force component in the string which will be approximately sufficient to balance the force accelerating the proof body. With the mass adjusted accordingly, only a small electrical input is needed to the armature 35 in order to hold a constant tension in the second wire, wire 23, of the wire pair.

Each pair of wires is pretensioned during assembly to a magnitude sufficient to keep each wire tightly stretched for all values of acceleration and rate of turn experienced in normal operation. This pretension is applied by elastic torque preset into the flexure member 33.

Because the system of wires which suspend the gyroscope are elastic, the precise location and orientation of the gyroscope axis within the structure 15 will change when the structure is accelerated or rotated in inertial space. Such a shift in the spin axis will result in cross-coupling and misalignment errors in the determination of the inertial forces and torques acting about the three orthogonal axes, X Y Z. It is the purpose of this invention to provide a means for control of tension in the pairs of wire comprising the gyroscope suspension so as to effectively eliminate he elastic compliance of the suspension and thereby maintain a fixed orientation and location of the spin axis within the gyroscope structure for all conditions of acceleration and inertial angular rate.

To show how this is accomplished, the control of wire pairs 23 and 24 will be described. These wires have an initial tension, $T_o$, set into them. With this tension, wire 23 will vibrate at a frequency $f_{23}$ in accordance with equation (1). The transverse vibrations of wire 23 are excited by means of the signal from a capacitance pickoff 36 driving amplifier 37 which powers the exciter coil 38. The magnetic field of coil 38 coerces wire 23 to vibrate transversely at its natural resonant frequency, $f_{23}$. The output signal from amplifier 37 having frequency $f_{23}$ is also fed to the frequency and phase comparator circuit 39 where it is compared with a signal having a precision reference frequency $f_o$. The output signal from comparator 39 is proportional to the phase difference between the reference frequency signal $f_o$ and the wire vibration frequency signal $f_{23}$. This signal is fed to power amplifier 40 and the output current from amplifier 40 passes through armature 35. This current flowing in armature 35 produces a proportional force on tension transducer 32 by reaction of this current with the magnetic field of magnet 34. Transducer 32 multiplies this force by its leverage ratio, typically a factor of 5 to 10, and applies this force as a tension modulation to wire 24, which in turn controls the tension in wire 23. Hence, the tension in wire 23 is controlled so as to maintain its vibration frequency $f_{23}$ constant through comparison to the reference frequency $f_o$.

The constant tension in wire 23 implies a constant strain, or stretch, of wire 23. Hence, the end of the gyroscope connected to wire 23 will remain fixed relative to structure 35. All of the inertial forces along the X-axis applied by the end of the gyroscope housing 13 to the junction of wires 23 and 24 are effectively carried by wire 24 as a result of the servo action described. Vibration of wire 24 is effected by means of the capacitance pickoff and magnetic driving solenoid of exciter 41 operating in conjunction with amplifier 42 to generate a signal of frequency $f_{24}$. The frequency $f_{24}$ of wire 24 will, therefore, be responsive to the force $F_{24x}$ applied by the gyroscope housing 13 to wires 23 and 24 in accordance with the equation $$f_{24}^2 = \frac{EI\pi^2}{4ml^3} + \frac{T_o}{4ml} + \frac{F_{24x}}{4ml} \qquad (2)$$

Because the first terms in this equation are constant, the frequency $f_{24}$ may be processed in a utilization means 60, such as a computer, to continuously determine the force $F_{24x}$.

The description above of the tension servo operation relating to wires 23 and 24 is typical of the tension servo operation for each of the other pairs of wires, such as 21–22, 25–26, 27–28 and 29–30. The net effect of the operation of all these servos is to keep the gyroscope spin axis rigidly fixed and aligned within the structure 15 and, hence, eliminate error sources which would otherwise result from elastic compliance of the wire suspension system under conditions of acceleration or inertial angular rate.

Figure 2:
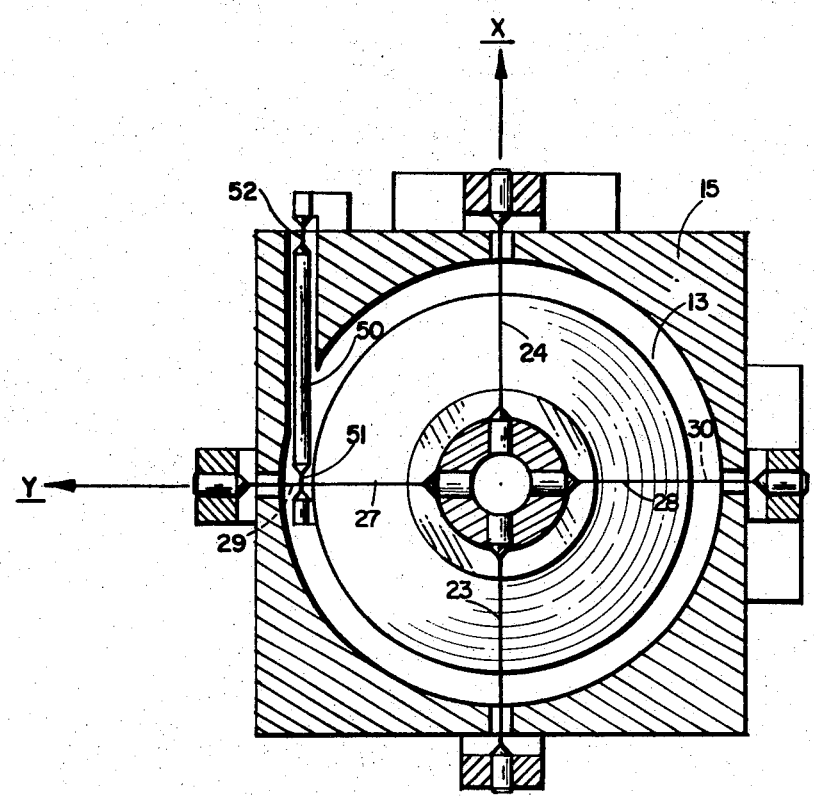
FIG. 2 is a sectioned view of FIG. 1, taken along the section lines 2—2.

Referring specifically to FIG. 2, the torque reaction strut 50, which is connected to the gyroscope housing 13 by means of flexure member 51 and the outer structure 15 by means of flexure 52, will absorb the reaction torque exerted on the housing 13 by the gyroscope rotor during startup and coastdown of the rotor. This start thereby prevents windup of the suspension wires which would otherwise occur as a result of rotor acceleration or deceleration.

While there has been disclosed what is considered to be the preferred embodiment of the invention, it will be manifest that many changes and modifications may be made therein without departing from the essential spirit of the invention. It is intended, therefore, in the annexed claims, to cover all such changes and modifications as fall within the true spirit of the invention.

We claim:

1. A sensor comprising in combination:
  a. a reference frame;
  b. proof body;
  c. five pairs of string members supporting said proof body with respect to said reference frame along three orthogonal axes, each pair of string members aligned along one of said three orthogonal axes;
  d. means for exciting a reference frequency vibration in said string members;
  e. sensing means for sensing the frequency of vibration in a second string member of each of said pair of string members wherein said frequency of vibration is a function of the tension in each of said second string members;
  f. a reference frequency source
  g. transducer means interposed between a first string of each one of said pairs of string members and said reference frame for adjusting the tension in the string members of said pair in response to the difference in frequency between the sensed signal from said sensing means and said reference frequency to maintain the frequency of vibration of said second string at said reference frequency; and
  h. pickoff means responsive to the frequency of vibration in said first string of each pair of string members to provide output signals proportional to the vibrations of said first string;
  I. utilization means for receiving the sensed signal from said pickoff means corresponding to the frequency of vibration of said first string and providing therefrom a signal indicative of the forces acting on said proof body.

2. The invention according to claim 1 wherein said transducer means is comprised of:
  a. lever members mounted to said reference frame by means of flexible fulcrums, one end of said first string of a pair connected to one end of said lever members;
  b. electromagnet means attached to the other end of said lever members to draw said lever end toward said reference frame in response to the sensed signal from said sensing means so as to adjust the tension in corresponding string members; and
  c. said lever member having its center of mass located in the region of said electromagnet means on the opposite side of said fulcrum from the string attachment point, and having a magnitude of mass such that, with an acceleration applied along the axis of the string, the resulting acceleration force component in the string attached to the lever member will be approximately sufficient to balance the force necessary to accelerate said proof mass, thereby requiring only a small electrical input to said electromagnetic means in order to hold constant tension in the second string of the pair.

3. The invention according to claim 2 wherein said flexible fulcrums exert coercive force on said lever members of a magnitude sufficient to establish vibrations in said string members at a preselected frequency with no forces acting on said gyroscope.

4. The invention according to claim 1 wherein said proof body is a gyroscope.

5. The invention according to claim 4 and further comprising:
   a rigid member connected between said gyroscope and said reference frame for limiting rotation of said gyroscope in response to rotations of the gyroscope rotor.
6. A sensor comprising in combination:
   a. a reference frame;
   b. a proof body, said body being a gyroscope having a rotor for rotation at high rates of speed about a spin axis;
   c. a first and second parallel pair of string members attached at one end to each end of said gyroscope along a first defined axis;
   d. a third and fourth parallel pair of string members attached at one end to each end of said gyroscope along a second defined axis orthogonal with said first defined axis;
   e. a fifth pair of string members attached at one end to each end of said gyroscope parallel to the spin axis of said gyroscope and mutually orthogonal to said first and second defined axes;
   f. a transducer means interposed between a first string of each of said pairs of string members and said reference frame for controlling the tension in said string members;
   g. sensing means responsive to the frequency of vibration in the second string of each pair of string members to provide a signal to said transducer means which is proportional to said vibrations so as to maintain the vibrations in said second string of each of said pair of string members constant; and
   h. pickoff means responsive to the frequency of vibration in the first string of each pair of string members to provide output signals proportional to the vibrations of said first string which signals are indicative of the forces acting on said gyroscope along the first and second defined axis and said spin axis.
7. The invention according to claim 6 wherein said transducer means is comprised of:
   a. lever members mounted to said reference frame by means of flexible fulcrums, one end of each of said first string of a pair connected to one end of said lever members; and
   b. electromagnet means attached to the other end of said lever members to draw said lever end toward said reference frame in response to the sensed signal from said sensing means so as to adjust the tension in corresponding string members.
8. The invention according to claim 6 and further comprising:
   means for comparing a reference signal against the pickoff signal from said second string, and for providing a difference signal to said transducer means so as to vary the tension in said string pairs to minimize said difference signal.
9. The invention according to claim 6 and further comprising:
   a rigid member connected between said gyroscope and said reference frame for limiting rotation of said gyroscope in response to rotations of said gyroscope rotor.
10. The invention according to claim 6 wherein said flexible fulcrums exert a coercive force on said lever member of a magnitude sufficient to establish vibrations in said string members at a preselected frequency with no forces acting on said gyroscope.

* * * * *